(12) United States Patent
Xing et al.

(10) Patent No.: US 10,432,359 B2
(45) Date of Patent: Oct. 1, 2019

(54) INFORMATION TRANSMISSION METHOD AND INFORMATION TRANSMISSION DEVICE

(71) Applicant: CHINA ACADEMY OF TELECOMMUNICATIONS TECHNOLOGY, Beijing (CN)

(72) Inventors: Yanping Xing, Beijing (CN); Yanan Lin, Beijing (CN); Jianhua Liu, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 15/564,730

(22) PCT Filed: Mar. 29, 2016

(86) PCT No.: PCT/CN2016/077682
§ 371 (c)(1),
(2) Date: Oct. 5, 2017

(87) PCT Pub. No.: WO2016/161910
PCT Pub. Date: Oct. 13, 2016

(65) Prior Publication Data
US 2018/0109358 A1 Apr. 19, 2018

(30) Foreign Application Priority Data
Apr. 9, 2015 (CN) .......................... 2015 1 0166991

(51) Int. Cl.
*H04L 1/08* (2006.01)
*H04L 1/18* (2006.01)
(Continued)

(52) U.S. Cl.
CPC ................ *H04L 1/08* (2013.01); *H04L 1/189* (2013.01); *H04L 1/1816* (2013.01);
(Continued)

(58) Field of Classification Search
None
See application file for complete search history.

(56) References Cited

U.S. PATENT DOCUMENTS

2006/0227789 A1* 10/2006 Dottling ................ H04L 1/0083
370/395.21
2011/0007834 A1 1/2011 Hoshino et al.
(Continued)

FOREIGN PATENT DOCUMENTS

CN 101765147 A 6/2010
CN 102013963 A 4/2011
(Continued)

OTHER PUBLICATIONS

International Preliminary Report on Patentability (IPRP; Ch. 1) for PCT/CN2016/077682 dated Oct. 19, 2017, and its English translation provided by WIPO.
(Continued)

*Primary Examiner* — Peter Chen
(74) *Attorney, Agent, or Firm* — Ladas & Parry, LLP

(57) ABSTRACT

An information transmission method and an information transmission device are provided, so as to determine redundancy versions corresponding to a plurality of consecutive subframes as an identical redundancy version, thereby to enable identical information to be transmitted within the plurality of consecutive subframes after a rate matching and enable an opposite end to perform coherent combination on the information transmitted within the plurality of consecutive subframes. The information transmission method includes steps of: determining, by a local end serving as a
(Continued)

transmitting end, information to be repeatedly transmitted within a repetition time period containing a plurality of subframes; and determining, by the local end, a redundancy version corresponding to each subframe in the repetition time period, performing a rate matching on a bit stream acquired by encoding the information based on the redundancy version corresponding to the subframe, and transmitting the bit stream processed through the rate matching to an opposite end, where a plurality of consecutive subframes among the subframes in the repetition time period corresponds to an identical redundancy version.

8 Claims, 7 Drawing Sheets

(51) Int. Cl.
H04W 28/04 (2009.01)
H04W 72/04 (2009.01)
H04W 4/70 (2018.01)

(52) U.S. Cl.
CPC ........... H04L 1/1819 (2013.01); H04W 28/04 (2013.01); H04W 72/0446 (2013.01); H04L 1/1812 (2013.01); H04W 4/70 (2018.02)

(56) References Cited

U.S. PATENT DOCUMENTS

2013/0343273 A1 12/2013 Barbieri et al.
2015/0280876 A1 10/2015 You et al.
2017/0156131 A1* 6/2017 Kimura ................... H04J 11/00

FOREIGN PATENT DOCUMENTS

| CN | 103378936 A | 10/2013 |
| CN | 103427942 A | 12/2013 |
| WO | 2009/113301 A1 | 9/2009 |
| WO | 2014/077577 A1 | 5/2014 |

OTHER PUBLICATIONS

Written Opinion of the International Search Authority for PCT/CN2016/077682 dated Jun. 14, 2016, and its English translation provided by WIPO.
From EPO Application No. 16776085.9, Supplementary European Search Report and Search Opinion dated Mar. 12, 2018.
From TW Application No. 105110479, Office Action dated Apr. 20, 2017 with Google English translation.
From TW Application No. 105110479, Office Action dated Mar. 31, 2018 with Google English translation.
R1-150200—LG Electronics, "PDSCH related issues for MTC"; 3GPP TSG RAN WG1 Meeting #80; Athens, Greece, Feb. 9-13, 2015; pp. 1-8.
From JP 2017-552453, Office Action dated Jul. 24, 2018 with machine English translation from Global Dossier.
International Search Report for PCT/CN2016/077682 dated Jun. 14, 2016, and its English translation provided by WIPO.
Written Opinion of the International Search Authority for PCT/CN2016/077682 dated Jun. 14, 2016, and its English translation provided by Bing.Com Microsoft Translate.

* cited by examiner

INFORMATION TRANSMISSION METHOD AND INFORMATION TRANSMISSION DEVICE

CROSS-REFERENCE TO RELATED APPLICATIONS

The present application is the U.S. national phase of PCT Application PCT/CN2016/077682 filed on Mar. 29, 2016, which claims priority to the Chinese patent application No. 20151016691.5 filed on Apr. 9, 2015, the disclosures of which are incorporated herein by reference in their entireties.

TECHNICAL FIELD

The present disclosure relates to the field of communication technology, in particular to an information transmission method and an information transmission device.

BACKGROUND

For a Machine Type Communications (MTC) project, a method for repeated transmission in a plurality of subframes in a physical channel has been proposed so as to enhance the coverage of a MTC device in a deep-fading scenario. In order to achieve the coverage enhancement up to 15 dB, the repeated transmission may be performed for dozens or hundreds of times. Currently, there is no conclusion about how to determine a redundancy version during a repeated transmission period.

In the related art, for downlink data transmission, transport blocks arrived within a Transmission Time Interval (TTI) are processed by an encoding unit, and then by the physical channel, and then transmitted on a corresponding physical resource. As shown in FIG. 1, the transport blocks from a Media Access Control (MAC) are processed by the encoding unit and the physical channel, and then transmitted in subframes (e.g., subframe #0 of radio frame #M, subframe #2 of radio frame #M+1, and subframe #3 of radio frame #M+2). In the TTIs, the transport blocks are processed independently.

A processing procedure of the transport block includes a rate matching procedure which includes sub-block interleaving, bit collection and bit selection. As shown in FIG. 2, during the bit collection, a system bit stream, a first check bit stream and a second check bit stream processed by a sub-block interleaver are cascaded. During the bit selection, an output bit stream is selected based on the redundancy version (RV=0, RV=2, RV=3 and RV=1) of the subframe. For the downlink data transmission, the redundancy version is indicated in Downlink Control Information (DCI).

For uplink data transmission, there are two modes, i.e., a single-subframe transmission mode and a TTI bundling mode. For the single-subframe transmission mode, a procedure is substantially similar to that for the downlink data transmission. The transport block within each TTI is processed by the encoding unit and then processed on the physical channel, and then transmitted on a corresponding resource. The transport blocks in the TTIs are processed independently.

The redundancy version for the uplink data transmission is determined by a parameter CURRENT_IRV at an MAC layer, and this parameter is used to indicate a serial number in a redundancy version sequence. After the transmission (the transmission for the first time or retransmission) of a Hybrid Automatic Repeat Request (HARQ), CURREN-T_IRV is incremented by 1. In addition, CURRENT_IRV is subjected to a modular four operation, and the redundancy version sequences are 0, 2, 3 and 1.

An uplink TTI bundling mode is used to enhance the uplink coverage, and different redundancy versions for one transport block are transmitted in a plurality of consecutive subframes (TTIs), i.e., the HARQ retransmission is performed automatically in a plurality of consecutive TTIs. During the HARQ retransmission, it is unnecessary to feed back any Acknowledgement (ACK)/Non-Acknowledgement (NACK). As shown in FIG. 3, after a Cyclic Redundancy Check (CRC) operation, a channel encoding operation and a rate matching have been performed on the transport block from the MAC layer, different redundancy versions for the transport block are transmitted in the plurality of consecutive TTIs. For example, four redundancy versions, i.e., RV=0, RV=2, RV=3 and RV=1, for each transport block are transmitted in FIG. 3.

However, in order to reduce the retransmission times as possible, thereby to prevent the decrease in the system spectral efficiency due to the retransmission as possible, after study, cross-subframe channel estimation has been proposed as an effective measure. The so-called cross-subframe channel estimation refers to joint channel estimation performed based on reference signals in a plurality of consecutive subframes using channel correlation. As a typical processor mode, a weighted averaging operation is performed on results of the channel estimation in the plurality of subframes. Correspondingly, coherent combination is performed on data sections on the premise that signals transmitted in the plurality of subframes for the coherent combination are identical to each other.

However, in the related art, for the downlink data transmission, the transport blocks in the TTIs are processed independently, and there is no mechanism in which one transport block is repeatedly transmitted in the plurality of subframes. For the uplink data transmission, one transport block may be repeatedly transmitted in the plurality of subframes through the TTI bundling mechanism, but the redundancy versions recurrently vary along with the subframes, i.e., the redundancy versions in adjacent subframes are different from each other. This means, the signals transmitted in the subframes are different from each other after the rate matching, so it is impossible to perform the coherent combination on the signals at the receiving end.

In a word, in the related art, during the retransmission of the information in the plurality of subframes, the redundancy versions recurrently vary along with the subframes, and the redundancy versions in the adjacent subframes are different from each other. At this time, the information transmitted in the subframes after the rate matching is different, and thereby, at an opposite end, the information received in the plurality of subframes for the coherent combination is different too. Hence, it is impossible to prevent the decrease in the system spectral efficiency due to the information retransmission.

SUMMARY

An object of the present disclosure is to provide an information transmission method and an information transmission device, so as to determine the redundancy versions corresponding to the plurality of consecutive subframes as an identical redundancy version, and enable the information transmitted in the plurality of subframes after the rate matching to be identical, thereby to enable the opposite end to perform the coherent combination on the information transmitted in the plurality of consecutive subframes and prevent the decrease in the system spectral efficiency due to the information retransmission.

In one aspect, the present disclosure provides in some embodiments an information transmission method, including steps of: determining, by a local end serving as a transmitting end, information to be repeatedly transmitted within a repetition time period containing a plurality of subframes; and determining, by the local end, a redundancy version corresponding to each subframe in the repetition time period, performing a rate matching on a bit stream acquired by encoding the information based on the redundancy version corresponding to the subframe, and transmitting the bit stream processed through the rate matching to an opposite end, where a plurality of consecutive subframes among the subframes in the repetition time period corresponds to an identical redundancy version.

According to the information transmission method in the embodiments of the present disclosure, in the case of performing the rate matching on the bit stream of the information acquired after the encoding operation based on the redundancy version corresponding to each subframe, the redundancy versions corresponding to the plurality of consecutive subframes are identical to each other, so the same information is transmitted in the plurality of consecutive subframes after the rate matching, and thereby it is able for the opposite end to perform coherent combination on the information transmitted in the plurality of consecutive subframes. As compared with the related art where the opposite end cannot perform the coherent combination because the redundancy versions corresponding to the subframes recurrently vary along with the subframes and different information is transmitted in the subframes after the rate matching, in the embodiments of the present disclosure, the redundancy versions corresponding to the plurality of consecutive subframes are identical to each other, and thereby the same information is transmitted in the plurality of consecutive subframes after the rate matching. In this way, it is able for the opposite end to perform the coherent combination on the information transmitted in the plurality of consecutive subframes, thereby to prevent the decrease in the system spectral efficiency due to the information retransmission. In addition, the redundancy versions corresponding to the plurality of consecutive subframes are identical to each other in the repetition time period, and different redundancy versions may probably be provided within the entire repetition time period, i.e., the redundancy versions may vary within the entire repetition time period. As a result, it is able to perform incremental redundancy combination.

In some embodiments of the present disclosure, the step of, determining, by the local end, the redundancy version corresponding to each subframe further includes: determining, by the local end, the redundancy version corresponding to a current subframe based on at least one predetermined redundancy version and a usage rule of the at least one predetermined redundancy version.

In some embodiments of the present disclosure, the step of, determining, by the local end, the redundancy version corresponding to the current subframe based on the at least one predetermined redundancy version and the usage rule of the at least one predetermined redundancy version further includes: determining, by the local end, an initial redundancy version as the redundancy version corresponding to a first subframe in the repetition time period, where the initial redundancy version is one of the at least one predetermined redundancy version; and determining, by the local end, the redundancy version corresponding to the current subframe among the subframes subsequent to the first subframe based on the at least one predetermined redundancy version, a usage order of the at least one predetermined redundancy version, a number of times repeating each redundancy version, and a number of times the redundancy version corresponding to a previous subframe relative to the current subframe is repeated.

In some embodiments of the present disclosure, the step of, determining, by the local end, the redundancy version corresponding to the current subframe among the subframes subsequent to the first subframe based on the at least one predetermined redundancy version, the usage order of the at least one predetermined redundancy version, the number of times repeating each redundancy version, and the number of times of the redundancy version corresponding to the previous subframe relative to the current subframe is repeated further includes: in the case that the number of times the redundancy version corresponding to the previous subframe relative to the current subframe is repeated is smaller than the number of times repeating the redundancy version corresponding to the previous subframe relative to the current subframe, determining the redundancy version corresponding to the previous subframe relative to the current subframe as the redundancy version corresponding to the current subframe; and in the case that the number of times the redundancy version corresponding to the previous subframe relative to the current subframe is repeated is equal to the number of times repeating the redundancy version corresponding to the previous subframe relative to the current subframe, determining the redundancy version following the redundancy version corresponding to the previous subframe relative to the current subframe in the usage order of the at least one predetermined redundancy version as the redundancy version corresponding to the current sub frame.

In some embodiments of the present disclosure, redundancy version pattern information is pre-stored in the local end and the opposite end, or the redundancy version pattern information is pre-determined by a network side end of the local end and the opposite end and then notified to a User Equipment (UE) end of the local end and the opposite end, where the redundancy version pattern information relates to the at least one redundancy version and the usage order of the at least one redundancy version.

In some embodiments of the present disclosure, the initial redundancy version is determined by the local end and the opposite end, or the initial redundancy version is determined by the local end and then notified to the opposite end.

In some embodiments of the present disclosure, the number of times repeating each redundancy version is pre-stored in the local end and the opposite end, or the number of times repeating each redundancy version is determined by a network side end of the local end and the opposite end and then notified to a UE end of the local end and the opposite end.

In some embodiments of the present disclosure, the information transmission method further includes: notifying, by the network side end of the local end and the opposite end, whether or not to use the number of times repeating each redundancy version through Downlink Control Information (DCI), or determining, by the local end and the opposite end, whether or not to use the number of times repeating each redundancy version based on a predetermined rule.

In some embodiments of the present disclosure, the step of indicating, by the network side end of the local end and the opposite end, whether or not to use the number of times repeating each redundancy version through the DCI further includes: in the case that the local end notifies through the DCI that the number of times repeating each redundancy version is used, determining the number of times repeating each redundancy version pre-stored in the local end and the opposite end as the number of times each redundancy version is to be repeated, or determining the number of times repeating each redundancy version pre-configured and notified by the network side end to the UE end of the local end and the opposite end as the number of times each redundancy version is to be repeated; and in the case that the local end notifies through the DC that the predetermined number of times repeating each redundancy version is not used, determining a number of the subframes in the repetition time period as the number of times each redundancy version is to be repeated.

In some embodiments of the present disclosure, the step of determining, by the local end and the opposite end, the number of times repeating each redundancy version based on the predetermined rule further includes: determining, by the local end and the opposite end, the number of times repeating each redundancy version based on a code rate for information transmission.

In some embodiments of the present disclosure, the step of determining, by the local end and the opposite end, the number of times repeating each redundancy version based on the code rate for information transmission further includes: in the case that the code rate for information transmission is greater than or equal to a predetermined threshold, determining the number of times repeating each redundancy version pre-stored in the local end and the opposite end as the number of number of times repeating each redundancy version is to be repeated, or determining the number of times repeating each redundancy version pre-configured and notified by the network side end to the UE end as the number of times each redundancy version is to be repeated; and in the case that the code rate for information transmission is smaller than the predetermined threshold, determining a number of the subframes in the repetition time period as the number of times each redundancy version is to be repeated.

In some embodiments of the present disclosure, the information transmission method further includes: pre-storing the redundancy version corresponding to each subframe in the local end and the opposite end, or transmitting, by the local end, the redundancy version corresponding to each subframe in the repetition time period to the opposite end, to instruct the opposite end upon receiving a message transmitted from the local end within the repetition time period to perform a rate de-matching on the information based on the redundancy version corresponding to each subframe within the repetition time period.

In some embodiments of the present disclosure, the information transmission method further includes: receiving, by the local end serving as a receiving end, information transmitted from the opposite end within the repetition time period, and performing the rate matching on the bit stream acquired by encoding the information based on the redundancy version corresponding to each subframe in the repetition time period, where a plurality of consecutive subframes among the subframes in the repetition time period corresponds to an identical redundancy version; and with respect to the information transmitted in each subframe in the repetition time period, determining, by the local end, the redundancy version corresponding to the subframe, and performing a rate de-matching operation on the information transmitted in the subframe based on the redundancy version corresponding to the subframe.

In another aspect, the present disclosure provides in some embodiments an information transmission device, including: a first processing unit, configured to determine information to be repeatedly transmitted within a repetition time period containing a plurality of subframes; a second processing unit, connected to the first processing unit and configured to determine a redundancy version corresponding to each subframe in the repetition time period, and perform a rate matching on a bit stream acquired by encoding the information based on the redundancy version corresponding to the subframe; and a transmission unit, connected to the second processing unit and configured to transmit the bit stream processed through the rate matching to an opposite end, where a plurality of consecutive subframes among the subframes in the repetition time period corresponds to an identical redundancy version.

According to the information transmission device in the embodiments of the present disclosure, in the case of performing the rate matching on the bit stream of the information acquired after the encoding operation based on the redundancy version corresponding to each subframe, the redundancy versions corresponding to the plurality of consecutive subframes are identical to each other, so the same information is transmitted in the plurality of consecutive subframes after the rate matching, and thereby it is able for the opposite end to perform coherent combination on the information transmitted in the plurality of consecutive subframes. As compared with the related art where the opposite end cannot perform the coherent combination because the redundancy versions corresponding to the subframes recurrently vary along with the subframes and different information is transmitted in the subframes after the rate matching, in the embodiments of the present disclosure, the redundancy versions corresponding to the plurality of consecutive subframes are identical to each other, and thereby the same information is transmitted in the plurality of consecutive subframes after the rate matching. In this way, it is able for the opposite end to perform the coherent combination on the information transmitted in the plurality of consecutive subframes, thereby to prevent the decrease in the system spectral efficiency due to the information retransmission. In addition, the redundancy versions corresponding to the plurality of consecutive subframes are identical to each other in the repetition time period, and different redundancy versions may probably be provided within the entire repetition time period, i.e., the redundancy versions may vary within the entire repetition time period. As a result, it is able to perform incremental redundancy combination.

In some embodiments of the present disclosure, the second processing unit is further configured to determine the redundancy version corresponding to a current subframe based on at least one predetermined redundancy version and a usage rule of the at least one predetermined redundancy version.

In some embodiments of the present disclosure, the second processing unit is further configured to: determine an initial redundancy version as the redundancy version corresponding to a first subframe, where the initial redundancy version is one of the at least one predetermined redundancy version; and determine the redundancy version corresponding to the current subframe among the subframes subsequent to the first subframe based on the at least one predetermined redundancy version, a usage order of the at least one predetermined redundancy version, a number of times repeating each redundancy version, and a number of times the redundancy version corresponding to a previous subframe relative to the current subframe is repeated.

In some embodiments of the present disclosure, the second processing unit is further configured to: with respect to each subframe in the repetition time period subsequent to the first subframe, in the case that the number of times the redundancy version corresponding to the previous subframe relative to the current subframe is repeated is smaller than the number of times repeating the redundancy version corresponding to the previous subframe relative to the current subframe, determine the redundancy version corresponding to the previous subframe relative to the current subframe as the redundancy version corresponding to the current subframe; and in the case that the number of times the redundancy version corresponding to the previous subframe relative to the current subframe is repeated is equal to the number of times repeating the redundancy version corresponding to the previous subframe relative to the current subframe, determine the redundancy version following the redundancy version corresponding to the previous subframe relative to the current subframe in the usage order of the at least one predetermined redundancy version as the redundancy version corresponding to the current subframe.

In some embodiments of the present disclosure, redundancy version pattern information is pre-stored in the second processing unit, or in the case that the information transmission device is a net work device, the second processing unit is further configured to determine the redundancy version pattern information and then notify the redundancy version pattern information to a User Equipment (UE) end at the opposite end, where the redundancy version pattern information relates to the at least one redundancy version and the usage order of the at least one redundancy version, where include.

In some embodiments of the present disclosure, the second processing unit is further configured to determine the initial redundancy version, or determine the initial redundancy version and notify the initial redundancy version to the opposite end.

In some embodiments of the present disclosure, the second processing unit is further configured to store the number of times repeating each redundancy version, or in the case that the information transmission device is the network side device, the second processing unit is further configured to determine the number of times repeating each redundancy version and then notify the number of times repeating each redundancy version to the UE.

In some embodiments of the present disclosure, the second processing unit is further configured to notify whether or not to use the number of times repeating each redundancy version based on a predetermined rule, or in the case that the information transmission device is the network side device, the second processing unit is further configured to notify through Downlink Control Information (DCI) whether or not to use the number of times repeating each redundancy version.

In some embodiments of the present disclosure, in the case that the information transmission device is the network side device, the second processing unit is further configured to: in the case that the second processing unit notifies through the DCI that the number of times repeating each redundancy version is used, determine the number of times repeating each redundancy version pre-stored in the local end and the opposite end as the number of times each redundancy version is to be repeated, or determine the number of times repeating each redundancy version pre-configured and notified by the network side end to the UE end as the number of times each redundancy version is to be repeated; and in the case that the second processing unit notifies through the DCI that the predetermined number of times repeating each redundancy version is not used, determine a number of the subframes in the repetition time period as the number of times each redundancy version is to be repeated.

In some embodiments of the present disclosure, number of times repeating each redundancy version the second processing unit is further configured to determine the number of times repeating each redundancy version based on a code rate for information transmission.

In some embodiments of the present disclosure, the second processing unit is further configured to: in the case that the code rate for information transmission is greater than or equal to a predetermined threshold, determine the number of times repeating each redundancy version pre-stored in the second processing unit as the number of times each redundancy version is to be repeated, or in the case that the information transmission device is the network side device, determine the number of times repeating each redundancy version pre-configured and notified by the network side end to the UE end as the number of times each redundancy version is to be repeated; and in the case that the code rate for information transmission is smaller than the predetermined threshold, determine a number of the subframes in the repetition time period as the number of times each redundancy version is to be repeated.

In some embodiments of the present disclosure, the second processing unit is further configured to pre-store the redundancy version corresponding to each subframe, or the transmission unit is further configured to transmit the redundancy version corresponding to each subframe in the repetition time period to the opposite end, to instruct the opposite end upon receiving a message transmitted from the local end within the repetition time period to perform a rate de-matching on the information based on the redundancy version corresponding to each subframe within the repetition time period.

In some embodiments of the present disclosure, the information transmission device further includes a reception unit connected to the second processing unit and configured to receive information transmitted from the opposite end within the repetition time period, and perform the rate matching on the bit stream acquired by encoding the information based on the redundancy version corresponding to each subframe in the repetition time period, where a plurality of consecutive subframes among the subframes in the repetition time period corresponds to an identical redundancy version, where the second processing unit is further configured to, with respect to the information transmitted in each subframe in the repetition time period, determine the redundancy version corresponding to the subframe, and perform a rate de-matching operation on the information transmitted in the subframe based on the redundancy version corresponding to the subframe.

In still yet another aspect, the present disclosure provides in some embodiments an information transmission device, including a processor, a transceiver and a memory. The processor is configured to read a program stored in the memory, so as to: in the case that a local end serves as a transmitting end, determine information to be repeatedly transmitted within a repetition time period containing a plurality of subframes; and determine a redundancy version corresponding to each subframe in the repetition time period, perform a rate matching on a bit stream acquired by encoding the information based on the redundancy version corresponding to the subframe, and transmit the bit stream processed through the rate matching to an opposite end, where a plurality of consecutive subframes among the subframes in the repetition time period corresponds to an identical redundancy version.

DETAILED DESCRIPTION OF THE EMBODIMENTS

The present disclosure will be described hereinafter in conjunction with the drawings and embodiments.

Figure 1:
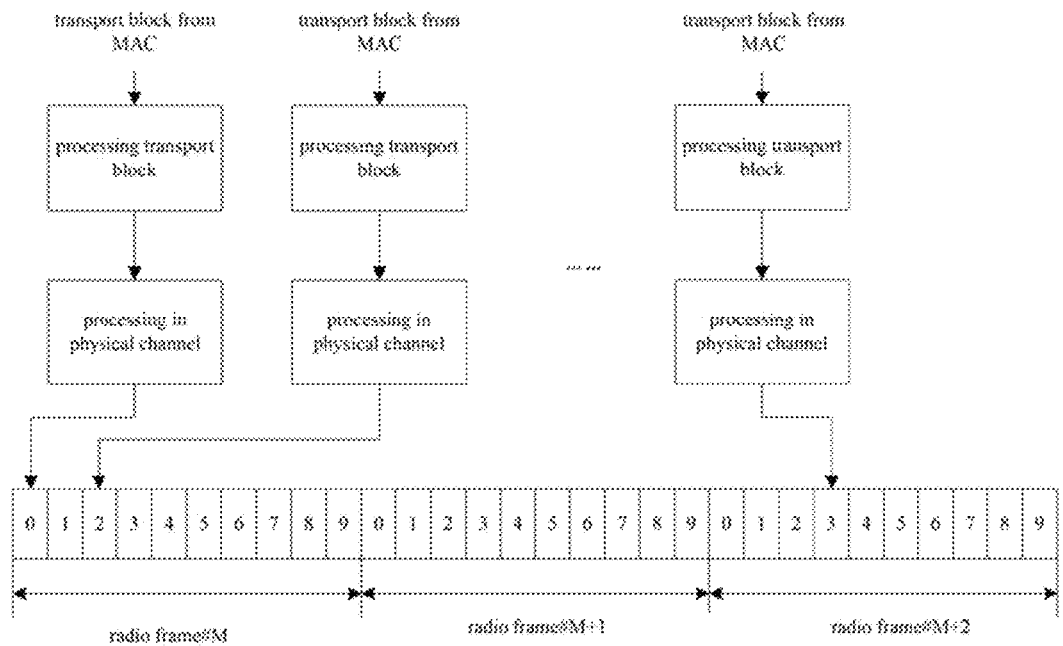
FIG. 1 is a schematic view showing the principle of information transmission through various transport blocks during downlink data transmission in the related art.
Figure 2:
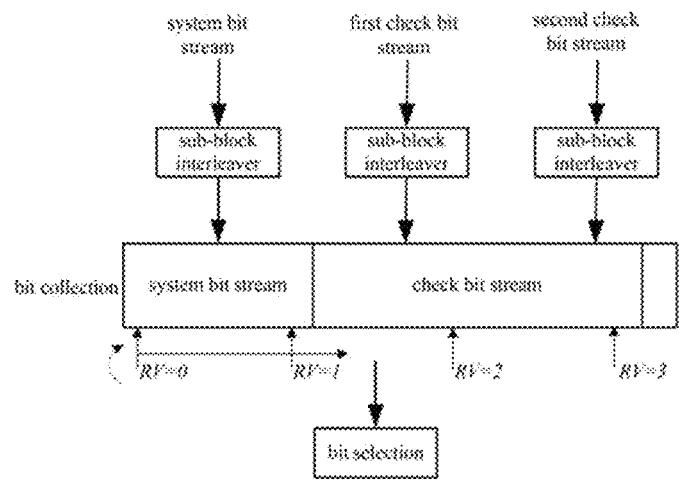
FIG. 2 is a schematic view showing an operating principle of a rate matching module in the related art.
Figure 3:
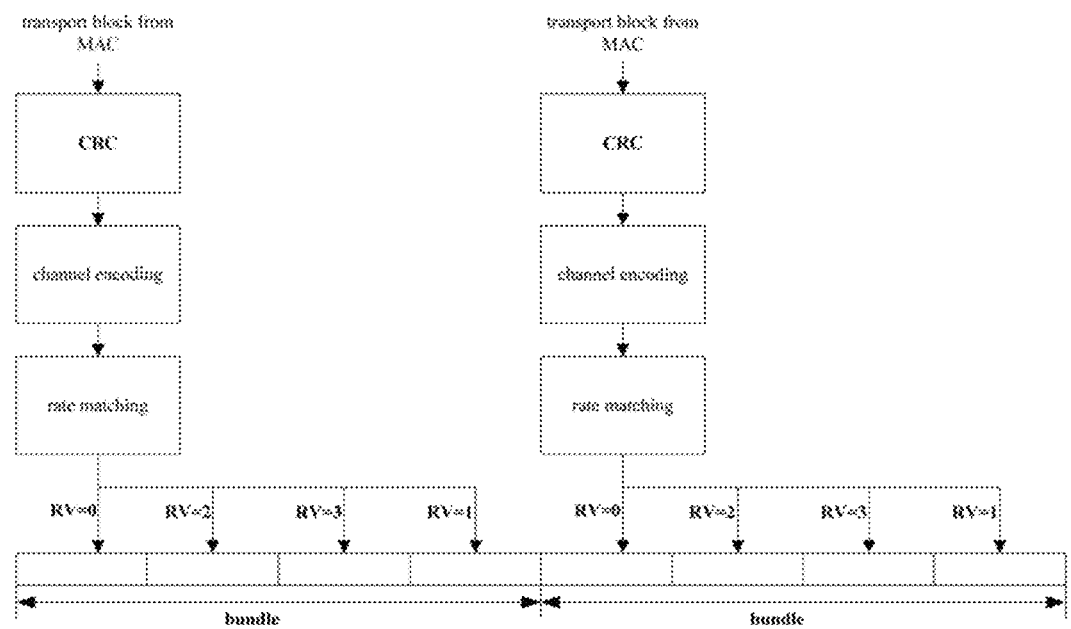
FIG. 3 is a schematic view showing the principle of information transmission through various transport blocks during data transmission in an uplink TTI bundling mode in the related art.
Figure 4:
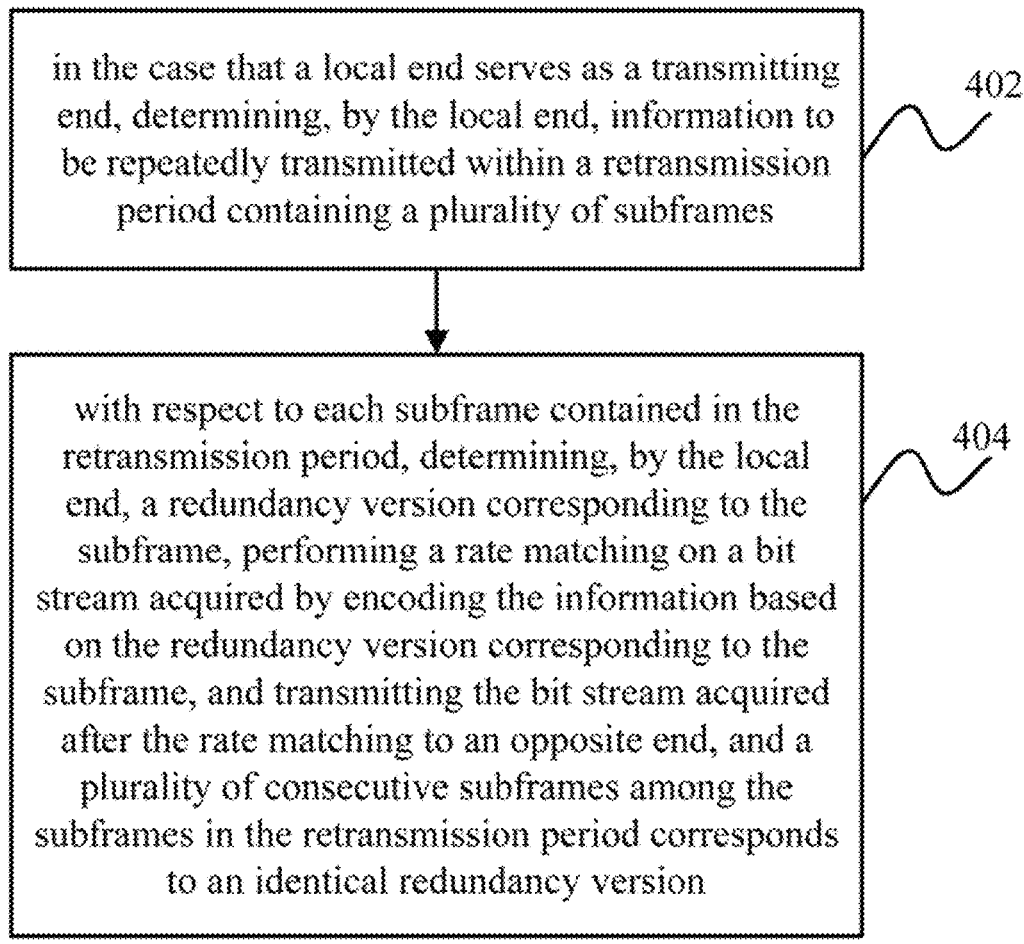
FIG. 4 is a flow chart of an information transmission method in some embodiments of the present disclosure.

The present disclosure provides in some embodiments an information transmission method which, as shown in FIG. 4, includes: Step 402 of, in the case that a local end serves as a transmitting end, determining, by the local end, information to be repeatedly transmitted within a repetition time period containing a plurality of subframes; and Step 404 of, with respect to each subframe contained in the repetition time period, determining, by the local end, a redundancy version corresponding to the subframe, performing a rate matching on a bit stream acquired by encoding the information based on the redundancy version corresponding to the subframe, and transmitting the bit stream acquired after the rate matching to an opposite end, and a plurality of consecutive subframes among the subframes in the repetition time period corresponds to an identical redundancy version.

According to the information transmission method in the embodiments of the present disclosure, in the case of performing the rate matching on the bit stream of the information acquired after the encoding operation based on the redundancy version corresponding to each subframe, the redundancy versions corresponding to the plurality of consecutive subframes are identical to each other, so the same information is transmitted in the plurality of consecutive subframes after the rate matching, and thereby it is able for the opposite end to perform coherent combination on the information transmitted in the plurality of consecutive subframes. As compared with the related art where the opposite end cannot perform the coherent combination because the redundancy versions corresponding to the subframes recurrently vary along with the subframes and different information is transmitted in the subframes after the rate matching, in the embodiments of the present disclosure, the redundancy versions corresponding to the plurality of consecutive subframes are identical to each other, and thereby the same information is transmitted in the plurality of consecutive subframes after the rate matching. In this way, it is able for the opposite end to perform the coherent combination on the information transmitted in the plurality of consecutive subframes, thereby to prevent the decrease in the system spectral efficiency due to the information retransmission. In addition, the redundancy versions corresponding to the plurality of consecutive subframes are identical to each other in the repetition time period, and different redundancy versions may probably be provided within the entire repetition time period, i.e., the redundancy versions may vary within the entire repetition time period. As a result, it is able to perform incremental redundancy combination.

It should be appreciated that, in some embodiments of the present disclosure, the information transmitted in a physical channel includes transport blocks, data and/or control information. The local end and the opposite end may each be a network side device (e.g., a base station), or a UE. Of course, in the case that the local end is the network side device, the opposite end may be the UE, and in the case that the local end is the UE, the opposite end may be the network side device.

During the implementation, the redundancy version may be determined at a physical layer. In some embodiments of the present disclosure, the information (e.g., the transport block) acquired after the channel encoding operation may be cached in a bit collection module of a rate matching module, and then bit stream may be selected by a bit selection module based on the determined redundancy version corresponding to each subframe.

In some embodiments of the present disclosure, the step of, with respect to each subframe contained in the repetition time period, determining, by the local end, the redundancy version corresponding to the subframe includes: with respect to each subframe contained in the repetition time period, determining, by the local end, a redundancy version corresponding to a current subframe based on at least one predetermined redundancy version and a usage rule of the at least one predetermined redundancy version. There exist the following two circumstances.

With respect to a first subframe contained in the repetition time period, the local end may determine an initial redundancy version as the redundancy version corresponding to the first subframe. The initial redundancy version is one of the at least one predetermined redundancy version. For example, in the case that the at least one predetermined redundancy version includes $RV_0$, $RV_1$, $RV_2$ and $RV_3$=0, 2, 3 and 1 and the predetermined initial redundancy version is $RV_2$, the redundancy version corresponding to the first subframe contained in the repetition time period may be $RV_2$=3.

With respect to each subframe contained in the repetition time period other than the first subframe, the local end may determine the redundancy version corresponding to the current subframe based on the at least one predetermined redundancy version, a usage order of the at least one predetermined redundancy version, a number of times repeating each redundancy version, and number of times the redundancy version corresponding to a previous subframe relative to the current subframe is repeated.

To be specific, with respect to each subframe contained in the repetition time period apart from the first subframe, in the case that the times of the redundancy version corresponding to the previous subframe which is to be consecutively and repeatedly used is smaller than the times of the redundancy version which is to be consecutively and repeatedly used, the redundancy version may be determined as the redundancy version corresponding to the current subframe. In the case that the times of the redundancy version corresponding to the previous subframe which is to be consecutively and repeatedly used is equal to the times of the redundancy version which is to be consecutively and repeatedly used, the a redundancy version immediately subsequent to the redundancy version corresponding to the previous subframe may be determined as the redundancy version corresponding to the current subframe based on the usage order of the at least one predetermined redundancy version.

In some embodiments of the present disclosure, the at least one predetermined redundancy version may include $RV_0, RV_1, \ldots, RV_{N-1}$, and the usage order may be $RV_0 \rightarrow RV_1 \rightarrow \ldots \rightarrow RV_{N-1} \rightarrow RV_0$, i.e., these redundancy versions may be used recurrently. The initial redundancy version may be $RV_M$, where $M \in (0, 1, \ldots, N-1)$. The number of times repeating each redundancy version may be represented by T, $T \in (1, 2, \ldots, R)$, where R represents the total number of the subframes contained in the repetition time period. At this time, the redundancy version of the transmission for an $i^{th}$ time may be $RV_n$, where $$n = \left(\left\lfloor \frac{i}{T} \right\rfloor + M\right) \mod N, \text{ and } i \in (0, 1, \ldots, R-1).$$

In this embodiment, the redundancy version corresponding to each subframe may be determined based on the transmission times of the current subframe. Of course, the redundancy version corresponding to the current subframe may also be determined based on the times of the redundancy version corresponding to a previous subframe which is to be consecutively and repeatedly transmitted.

To be specific, in the case that the times of the redundancy version corresponding to the previous subframe which is to be consecutively and repeatedly used is smaller than the times of the redundancy version which is to be consecutively and repeatedly used, the redundancy version may be determined as the redundancy version corresponding to the current subframe, and at this time, the times of the redundancy version corresponding to the current subframe which is to be consecutively and repeatedly used may be incremented by 1.

In the case that the times of the redundancy version corresponding to the previous subframe which is to be consecutively and repeatedly used is equal to the times of the redundancy version which is to be consecutively and repeatedly used, determining the a redundancy version immediately subsequent to the redundancy version corresponding to the previous subframe as the redundancy version corresponding to the current subframe based on the usage order of the at least one predetermined redundancy version.

During the implementation, for the number of times repeating each redundancy version, the redundancy versions corresponding to the plurality of consecutive subframes may be identical to each other, so the same information acquired after the rate matching may be transmitted in the plurality of consecutive subframes. As a result, it is able for the opposite end to perform the coherent combination on the information transmitted in the plurality of consecutive subframes, thereby to prevent decrease in the system spectral efficiency due to the information retransmission.

In some embodiments of the present disclosure, pattern information about the redundancy versions is pre-stored in the local end and the opposite information, or the pattern information about the redundancy versions is determined by a network side end of the local end and the opposite end, and then notified to a User Equipment (UE) end of the local end and the opposite end. The pattern information about the redundancy versions includes at least one redundancy version and the usage order of the at least one redundancy version.

During the implementation, the pattern information about the redundancy version may be pre-stored in the local end and the opposite end based on a protocol agreement, or notified, by the network side end of the local end and the opposite end to the UE end of the local end and the opposite end through high-layer signaling (e.g., RRC signaling), system broadcasting or DCI.

In some embodiments of the present disclosure, the initial redundancy version is determined by the local end and the opposite end, or determined by the local end and then notified to the opposite end.

During the implementation, the initial redundancy version may be determined at a MAC layer of the local end and the opposite end, or it may be determined by the local end and then notified to the opposite end through the high-layer signaling (e.g., the RRC signaling), the system broadcasting and the DCI.

In some embodiments of the present disclosure, the number of times repeating each redundancy version is pre-stored in the local end and the opposite end, or the number of times repeating each redundancy version is determined by the network side end of the local end and the opposite end and then notified to the UE end of the local end and the opposite end.

In some embodiments of the present disclosure, the information transmission method further includes: indicating, by the network side end of the local end and the opposite end, whether or not to use the number of times repeating each redundancy version through DCI, or determining, by the local end and the opposite end, whether or not to use the number of times repeating each redundancy version based on a predetermined rule.

During the implementation, the local end may determine the number of times repeating each redundancy version based on the DCI or the predetermined rule. The predetermined rule may include whether or not the code rate for the information transmission is greater than or equal to a predetermined threshold, or whether or not the UE supports the change of the redundancy version within the repetition time period.

It should be appreciated that, in the case that the network side end of the local end and the opposite end indicates whether or not to use the number of times repeating each redundancy version through the DCI, it may indicate whether or not to use the times of each redundancy version, which is to be consecutively and repeatedly used, pre-stored in the local end and the opposite end through the DCI, or indicate whether or not to use the times of each redundancy version, which is to be consecutively and repeatedly used, pre-configured and notified by the network side end to the UE end of the local end and the opposite end through the DCI.

In some embodiments of the present disclosure, the step of indicating, by the network side end of the local end and the opposite end, whether or not to use the number of times repeating each redundancy version through the DCI includes: in the case that the local end indicates to use the number of times repeating each redundancy version through the DCI, determining the times of each redundancy version, which is to be consecutively and repeatedly used, pre-stored in the local end and the opposite end as the number of times repeating each redundancy version, or determining the times of each redundancy version, which is to be consecutively and repeatedly used, pre-configured and notified by the network side end to the UE end of the local end and the opposite end as the times of each redundancy version which is to; and in the case that the local end indicates not to use the number of times repeating each redundancy version through the DCI, determining the number of subframes contained in the repetition time period as the number of times repeating each redundancy version.

In some embodiments of the present disclosure, the step of determining, by the local end and the opposite end, the number of times repeating each redundancy version based on the predetermined rule includes determining, by the local end and the opposite end, the number of times repeating each redundancy version based on a code rate for information transmission.

In some embodiments of the present disclosure, the step of determining, by the local end and the opposite end, the number of times repeating each redundancy version based on the code rate for information transmission includes: in the case that the code rate for information transmission is greater than or equal to a predetermined threshold, determining the times of each redundancy version, which is to be consecutively and repeatedly used, pre-stored in the local end and the opposite end as the number of times repeating each redundancy version, or determining the times of each redundancy version, which is to be consecutively and repeatedly used, pre-configured and notified by the network side end to the UE end as the times of each redundancy version which is to be consecutively and repeatedly us; and in the case that the code rate for information transmission is smaller than the predetermined threshold, determining the number of subframes contained in the repetition time period as the number of times repeating each redundancy version.

The predetermined threshold may be pre-stored in the local end and the opposite end, or determined by the network side end of the local end and the opposite end and notified to the UE end of the local end and the opposite end. The predetermined threshold may be a default value, or set based on the practical need. For example, the predetermined threshold may be 9.

The information transmission method in the embodiments of the present disclosure will be described hereinafter in more details.

In some embodiments of the present disclosure, for the uplink data transmission, a redundancy version pattern may be pre-agreed in a protocol. For example, the redundancy version patterns defined in the protocol may be $RV_0$, $RV_1$, $RV_2$, $RV_3$=0, 2, 3, 1, i.e., the usage order of the four redundancy versions may be $RV_0 \rightarrow RV_1 \rightarrow RV_2 \rightarrow RV_3$. The times T of each redundancy version which is to be consecutively and repeatedly used may also be pre-agreed in the protocol, e.g., T=4.

Figure 5A:
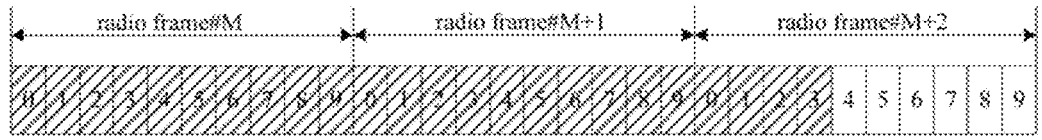
FIGS. 5A-5E are schematic views showing the allocation of redundancy versions corresponding to various subframes contained in a repetition time period in some embodiments of the present disclosure.

To be specific, for a Frequency Division Duplexing (FDD) system, as shown in FIG. 5A, the UE may receive a scheduling grant from the network side device (e.g., the base station), and a resource consisting of 24 consecutive subframes starting from subframe #0 of radio frame #M may be allocated for an uplink transport block the UE.

Figure 5B:
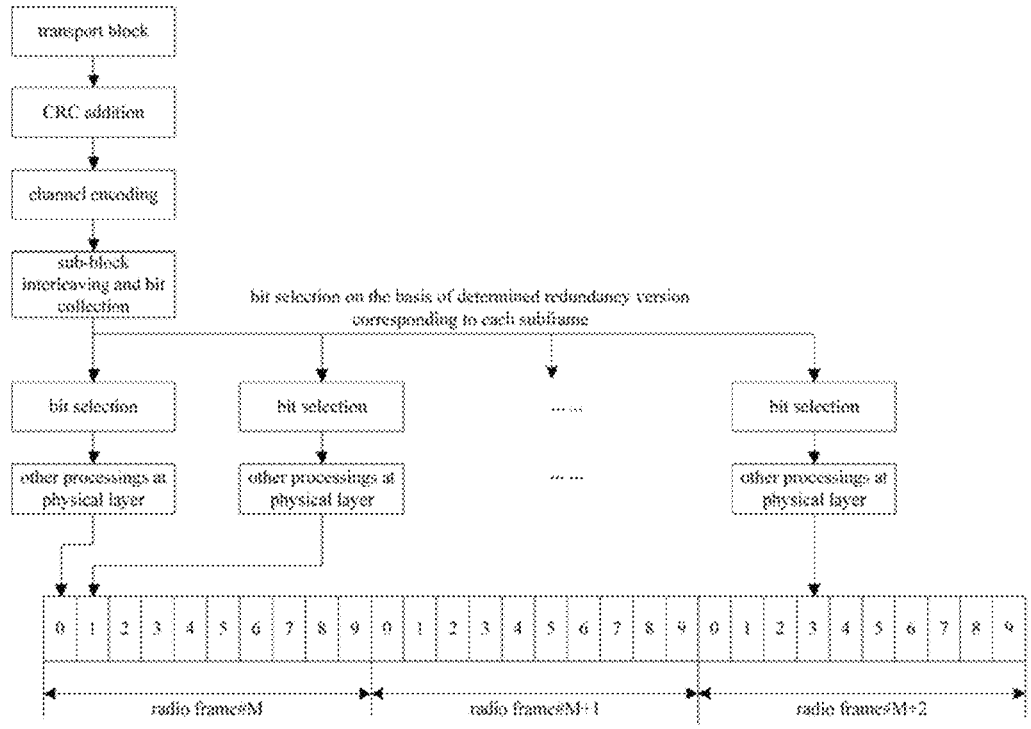

An MAC layer at the UE side may determine an initial redundancy version $RV_M$ for the current transmission based on a variable CURRENT_IRV, and $RV_M = RV_0 = 0$. As shown in FIG. 5B, the MAC layer may deliver the transport block and CURRENT_IRV to a physical layer. At the physical layer, a CRC may be added to the transport block, and then a channel encoding operation and subsequently a rate matching may be performed. Cascaded data acquired after the sub-block interleaving operation may be cached in a bit collection module of a rate matching module. In each subframe contained in the repetition time period, a bit selection module may determine the redundancy version corresponding to each subframe based on the redundancy version pattern, the initial redundancy version, the number of times repeating each redundancy version, and the current transmission times, and then select the corresponding output data based on the encoding data cached in the bit collection module and the determined redundancy version. A redundancy version for an $i^{th}$ transmission time may be $RV_n$, where $$n = \left(\left\lfloor \frac{i}{4} \right\rfloor + 0\right) \bmod 4 \text{ and } i = 0, 1, \ldots, 23.$$

Figure 5C:
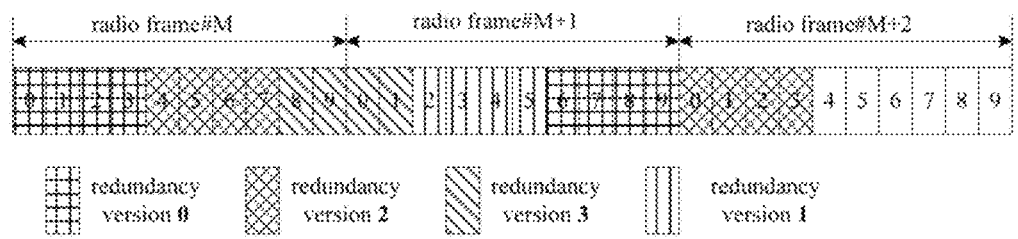

As shown in FIG. 5C, the redundancy version corresponding to $0^{th}$ to $3^{rd}$ subframes may be $RV_0$=0, the redundancy version corresponding to $4^{th}$ to $7^{th}$ subframes may be $RV_1$=2, the redundancy version corresponding to $8^{th}$ to $11^{th}$ subframes may be $RV_2$=3, and so on.

Correspondingly, at the base station side, the redundancy versions, i.e., 0, 0, 0, 0, 2, 2, 2, 2, 3, 3, . . . , corresponding to the subframes contained in the repetition time period may be determined based on the redundancy version pattern, the initial redundancy version, the number of times repeating each redundancy version, and the current transmission times, and then a rate de-matching operation may be performed on the data received in the subframes contained in the repetition time period based on the redundancy version corresponding to each subframe.

At the base station side, the coherent combination may be performed with respect to the four consecutive subframes with an identical redundancy version, and the non-coherent combination may be performed with respect to the subframes with different redundancy versions. In this way, it is able to improve the channel estimation performance through cross-subframe channel estimation, and change the redundancy versions within the repetition time period, thereby to achieve incremental redundancy combination and acquire a combination gain for the incremental redundancy combination during the transmission at a high code rate.

Figure 5D:
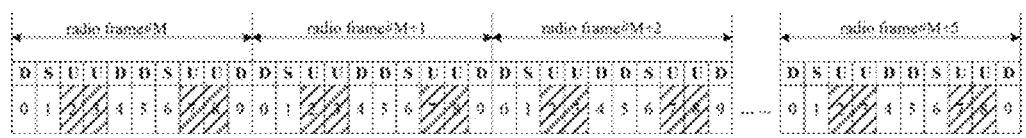

It should be appreciated that, for a Time Division Duplexing (TDD) system, due to the existence of uplink/downlink subframe configurations, the plurality of subframes allocated for one transport block may be inconsecutive temporally. Still taking the above-mentioned parameters as an example, as shown in FIG. 5D, the UE may receive a scheduling grant from the base station, and a resource consisting of 24 consecutive uplink subframes starting from subframe #0 of radio frame #M may be allocated for one uplink transport block of the UE. At this time, the redundancy version for the $i^{th}$ transmission time may be $RV_n$, where $$n = \left(\left\lfloor \frac{i}{4} \right\rfloor + 0\right) \bmod 4 \text{ and } i = 0, 1, \ldots, 23.$$

Figure 5E:
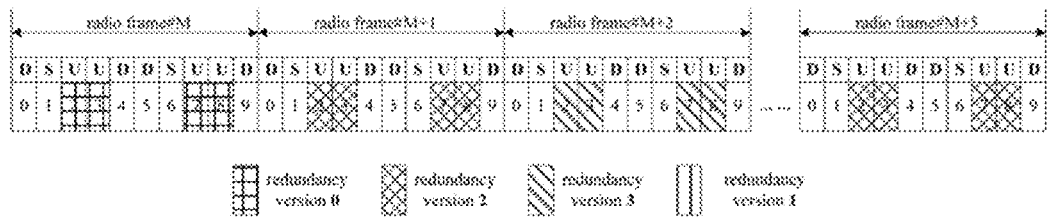

As shown in FIG. 5E, the redundancy version corresponding to subframe #2, #3, #7 and #8 of radio frame #M may be $RV_0$=0, the redundancy version corresponding to subframes #2, #3, #7 and #8 of radio frame #M+1 may be $RV_1$=2, the redundancy version corresponding to subframe #2, #3, #7 and #8 of radio frame #M+2 may be $RV_2$=3, the redundancy version corresponding to subframes #2, #3, #7 and #8 of radio frame #M+2 may be $RV_2$=3, the redundancy version corresponding to subframe #2, #3, #7 and #8 of radio frame #M+2 may be $RV_2$=3, the redundancy version corresponding to subframes #2, #3, #7 and #8 of radio frame #M+3 may be $RV_3$=1, the redundancy version corresponding to subframe #2, #3, #7 and #8 of radio frame #M+4 may be $RV_0$=0, and the redundancy version corresponding to subframe #2, #3, #7 and #8 of radio frame #M+5 may be $RV_1$=2.

In some embodiments of the present disclosure, for the downlink data transmission, the redundancy version pattern may be pre-agreed in a protocol. For example, the redundancy version patterns defined in the protocol may be $RV_0$, $RV_1$=0, 2. The times T of each redundancy version which is to be consecutively and repeatedly used and the initial redundancy version $RV_M$ may be notified by the base station to the UE through the DCI.

Figure 6A:
FIGS. 6A-6B are other schematic views showing the allocation of the redundancy versions corresponding to the various subframes contained in the repetition time period in some embodiments of the present disclosure.

To be specific, taking the FDD system as an example, as shown in FIG. 6A, the base station may allocate for one downlink transport block of the UE a resource consisting of 24 consecutive subframes starting from subframe #0 of radio frame #M through the DCI, and the DCI indicates the times T of each redundancy version which is to be consecutively and repeatedly used (T=6) and the initial redundancy version $RV_M$ ($RV_M$=$RV_1$=2). It should be appreciated that, the DCI may implicitly indicate the number of times repeating each redundancy version through any other information domain. For example, the DCI may indicate the number of subframes for the cross-subframe channel estimation, and the number of times repeating each redundancy version may be implicitly indicated by the number of the subframes for the cross-subframe channel estimation, i.e., the number of times repeating each redundancy version may be equal to the number of the subframes for the cross-subframe channel estimation.

At the MAC layer of the base station, the transport block for the current transmission may be determined and then delivered to the physical layer. At the physical layer, a CRC may be added to the transport block, and then the channel encoding operation and the rate matching may be performed. Cascaded data acquired after the sub-block interleaving operation may be cached in the bit collection module of the rate matching module. In each subframe contained in the repetition time period, the bit selection module may determine the redundancy version corresponding to each subframe based on the redundancy version pattern, the initial redundancy version, the number of times repeating each redundancy version, and the current transmission times, and then select the corresponding output data based on the encoding data cached in the bit collection module and the determined redundancy version. A redundancy version for an $i^{th}$ transmission time may be $RV_n$, where $$n = \left(\left\lfloor \frac{i}{6} \right\rfloor + 1\right) \bmod 2 \text{ and } i = 0, 1, \ldots, 23.$$

Figure 6B:
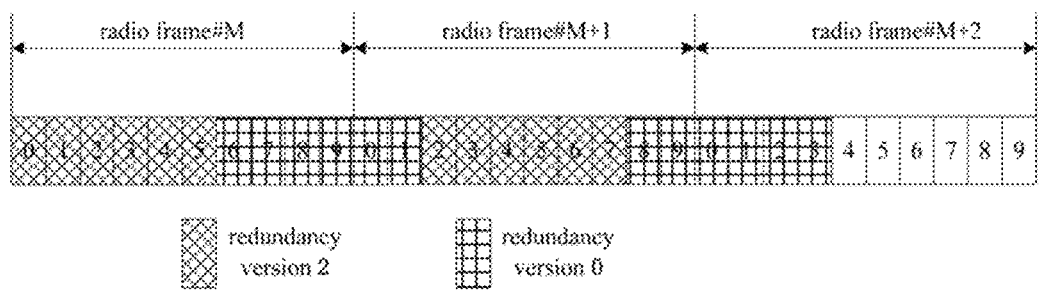

As shown in FIG. 6B, the redundancy version corresponding to $0^{th}$ to $5^{rd}$ subframes may be $RV_1$=2, the redundancy version corresponding to $6^{th}$ to $11^{th}$ subframes may be $RV_0$=0, the redundancy version corresponding to $12^{th}$ to $17^{th}$ subframes may be $RV_1$=2, and the redundancy version corresponding to $18^{th}$ to $23^{rd}$ subframes may be $RV_0$=0.

Correspondingly, at the UE side, the redundancy versions, i.e., 2, 2, 2, 2, 2, 2, 0, 0, . . . , corresponding to the subframes contained in the repetition time period may be determined based on the redundancy version pattern, the initial redundancy version, the number of times repeating each redundancy version, and the current transmission times, and then the rate dc-matching operation may be performed on the data received in the subframes contained in the repetition time period based on the redundancy version corresponding to each subframe. At the UE side, the coherent combination may be performed with respect to the six consecutive subframes with an identical redundancy version, and the non-coherent combination may be performed with respect to the subframes with different redundancy versions. In this way, it is able to improve the channel estimation performance through cross-subframe channel estimation, and change the redundancy versions within the repetition time period, thereby to achieve incremental redundancy combination and acquire a combination gain for the incremental redundancy combination during the transmission at a high code rate.

In some embodiments of the present disclosure, for the uplink data transmission, a redundancy version pattern may be pre-agreed in a protocol. For example, the redundancy version patterns defined in the protocol may be $RV_0$, $RV_1$, $RV_2$, $RV_3$=0, 2, 3, 1. At the network side, the times T' of each redundancy version which is to be consecutively and repeatedly used may be configured through high-layer signaling, and T'=1. Further, one bit in the DCI may be used to indicate the times T of each redundancy version which is to be consecutively and repeatedly used (T=T' or T is equal to the total number of subframes contained in the repetition time period).

In some embodiments of the present disclosure, at the network side, the times T of each redundancy version which is to be consecutively and repeatedly used (T=T' or T is equal to the total number of subframes contained in the repetition time period) may be determined based on a code rate for the current scheduling. In the case that the code rate is large, T=T', i.e., the redundancy versions within the repetition time period are different, so it is able to achieve the incremental redundancy combination. In the case that the code rate is small, T may be equal to the total number of subframes contained in the repetition time period, i.e., the redundancy version within the repetition time period is invariable. For the transmission at a small code rate, the incremental redundancy combination fails to acquire any obvious gain relative to the coherent combination.

Figure 7A:
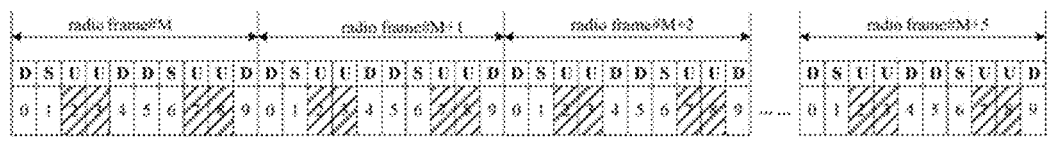
FIGS. 7A-7C are yet other schematic views showing the allocation of the redundancy versions corresponding to the various subframes contained in the repetition time period in some embodiments of the present disclosure.

To be specific, as shown in FIG. 7A, taking the TDD system as an example, the UE may receive a scheduling grant from the base station, and a resource consisting of 24 consecutive uplink subframes starting from subframe #0 of radio frame #M may be allocated for one uplink transport block of the UE.

In addition, the DCI carrying the scheduling grant may indicate that T=T'. At the MAC layer of the UE, the initial redundancy version $RV_M$ ($RV_M=RV_2=3$) for the current transmission maybe determined based on CURRENT_IRV. The redundancy version for the $i^{th}$ transmission may be $RV_n$, where $$n = \left(\left\lfloor \frac{i}{1} \right\rfloor + 2\right) \bmod 4 = (i+2) \bmod 4 \text{ and } i = 0, 1, \ldots, 23.$$

Figure 7B:
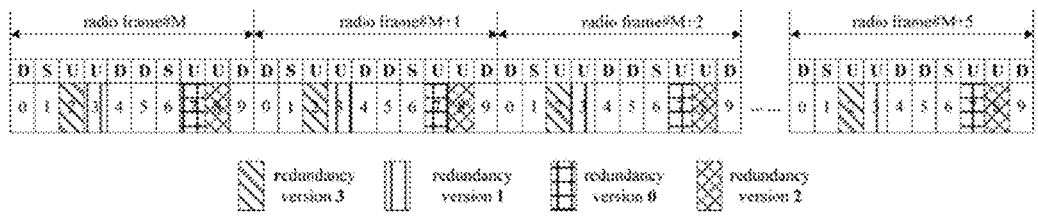

As shown in FIG. 7B, starting from the $0^{th}$ subframe, the redundancy versions may be $RV_2=3$, $RV_3=1$, $RV_0=0$, $RV_1=2$, $RV_2=3$, and so on.

Figure 7C:
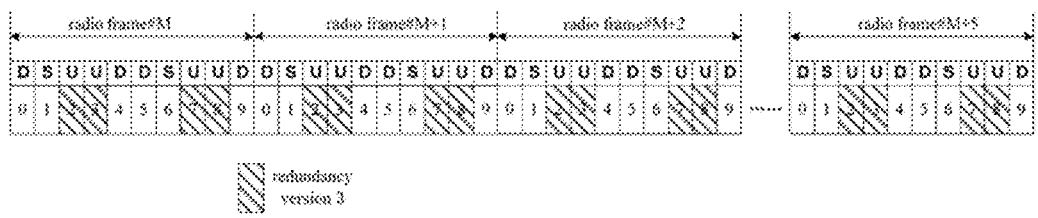

In the case that the DCI carrying the scheduling grant indicates that T is equal to the total number of subframes contained in the repetition time period, as shown in FIG. 7C, at the MAC layer of the UE, the initial redundancy version $RV_M$ for the current transmission may be determined based on CURRENT_IRV, and $RV_M=RV_2=3$. At this time, for the redundancy version $RV_n$ for each subframe contained in the repetition time period, $RV_n=RV_M=RV_2=3$.

In some embodiments of the present disclosure, for the downlink data transmission, the redundancy version pattern may be notified through a broadcast message at the network side. The broadcast redundancy version patterns may be $RV_0$, $RV_1$, $RV_2$, $RV_3=0, 2, 3, 1$. At the network side, the times T' of each redundancy version which is to be consecutively and repeatedly used may be configured through the high-layer signaling, and T'=4. In addition, on the basis of a protocol agreement, in the case that an MCS is greater than a predetermined threshold $MCS_{thre}$, the transmission times T of a single redundancy version may be equal to T', and otherwise, T may be equal to the total number of subframes contained in the repetition time period. As set in the protocol agreement, $MCS_{thre}=9$.

Figure 8A:
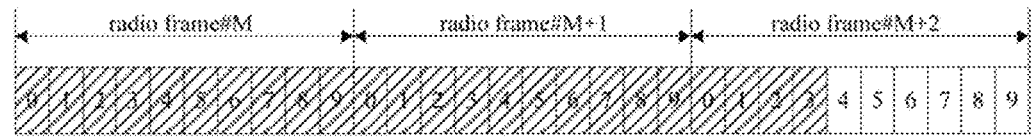
FIGS. 8A-8C are still yet schematic views showing the allocation of the redundancy versions corresponding to the various subframes contained in the repetition time period in some embodiments of the present disclosure.

To be specific, as shown in FIG. 8A, taking the FDD system as an example, a resource consisting of 24 consecutive subframes starting from subframe #0 of radio frame #M may be allocated by the base station for one downlink transport block of the UE.

Figure 8B:
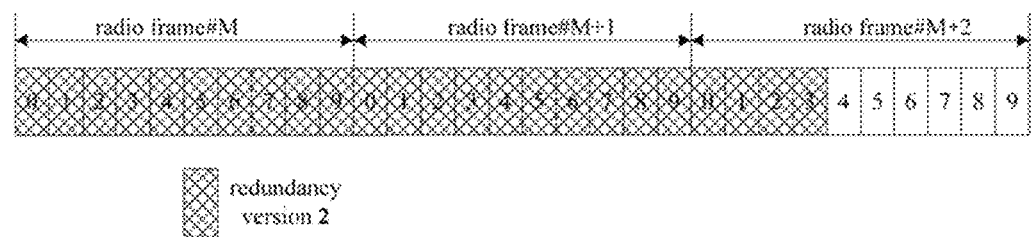

As shown in FIG. 8B, for the initial redundancy version $RV_M$ indicated by the DCI, $RV_M=RV_1=2$, and the MCS indicated by the DCI may be 9. Because the MCS is smaller than or equal to $MCS_{thre}$, for the redundancy version $RV_n$ corresponding to each subframe contained in the repetition time period, $RV_n=RV_M=RV_2=2$.

Figure 8C:
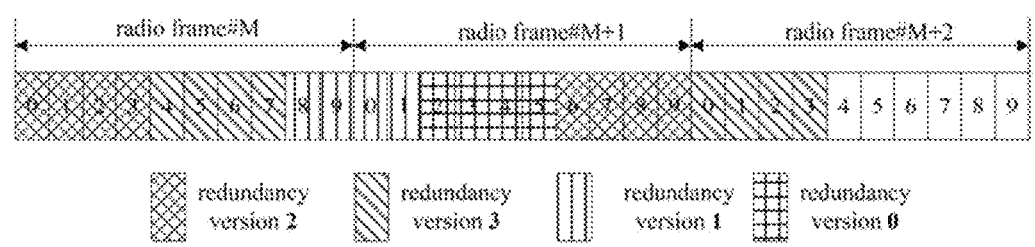

As shown in FIG. 8C, for the initial redundancy version $RV_M$ indicated by the DCI, $RV_M=RV_1=2$, and the MCS indicated by the DCI may be 10. Because the MCS is smaller than or equal to $MCS_{thre}$, the redundancy version for the ith transmission may be $RV_n$, where $$n = \left(\left\lfloor \frac{i}{4} \right\rfloor + 1\right) \bmod 4 \text{ and } i = 0, 1, \ldots, 23.$$

In other words, the redundancy version corresponding to the $0^{th}$ to $3^{rd}$ subframes may be $RV_1=2$, the redundancy version corresponding to the $4^{th}$ to $7^{th}$ subframes may be $RV_2=3$, the redundancy version corresponding to the $8^{th}$ to $11^{th}$ subframes may be $RV_3=1$, and so on.

In some embodiments of the present disclosure, the information transmission method further includes: pre-storing the redundancy version corresponding to each subframe in the local end and the opposite end, or transmitting, by the local end, the redundancy version corresponding to each subframe contained in the repetition time period to the opposite end, so as to, upon the receipt of a message from the local end within the repetition time period, instruct the opposite end to perform a rate de-matching operation on the information using the redundancy version corresponding to each subframe within the repetition time period.

During the implementation, the local end and the opposite end may determine the redundancy version corresponding to each subframe contained in the repetition time period based on the at least one predetermined redundancy version and the usage rule of the at least one predetermined redundancy version, or the redundancy version corresponding to each subframe contained in the repetition time period may be directly stored in the local end and the opposite end. Of course, the local end may also transmit the redundancy version corresponding to each subframe contained in the repetition time period to the opposite end.

In some embodiments of the present disclosure, the information transmission method further includes: in the case that the local end serves as a receiving end, receiving, by the local end, information from the opposite end within the repetition time period, and performing the rate matching on the bit stream of the information acquired after the encoding operation based on the redundancy version corresponding to each subframe contained in the repetition time period, redundancy versions corresponding to the plurality of consecutive subframes being identical to each other; and with respect to the information transmitted in each subframe contained in the repetition time period, determining, by the local end, the redundancy version corresponding to the subframe, and performing the rate de-matching operation on the information transmitted in the subframe based on the redundancy version corresponding to the subframe.

During the implementation, in the case that the local end severs as the receiving end, it may determine the redundancy version corresponding to each subframe contained in the repetition time period in the case of receiving the information from the opposite end, and perform the rate matching on the bit stream of the information acquired after the encoding operation based on the redundancy version corresponding to each subframe contained in the repetition time period.

Figure 9:
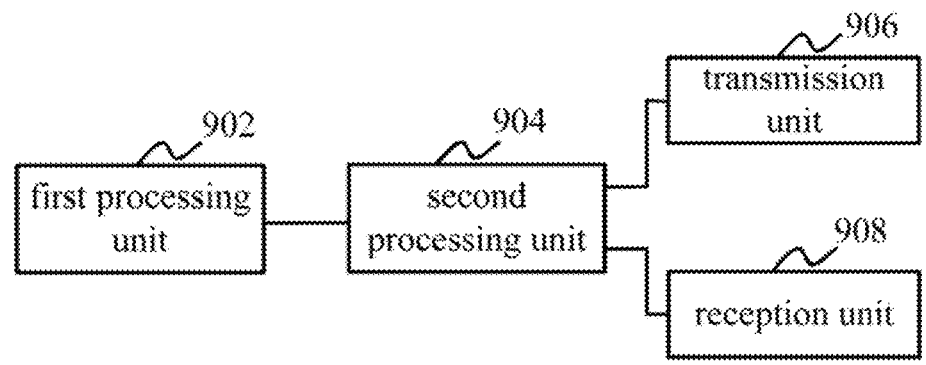
FIG. 9 is a schematic view showing an information transmission device in some embodiments of the present disclosure.

The present disclosure further provides in some embodiments an information transmission device which, as shown in FIG. 9, includes: a first processing unit 902 configured to, in the case that a local end serves as a transmitting end, determine information to be repeatedly transmitted within a repetition time period containing a plurality of subframes; a second processing unit 904 connected to the first processing unit 902 and configured to, with respect to each subframe contained in the repetition time period, determine a redundancy version corresponding to the subframe, and perform a rate matching on a bit stream acquired by encoding the information based on the redundancy version corresponding to the subframe; and a transmission unit 905 connected to the second processing unit 904 and configured to transmit the bit stream acquired after the rate matching to an opposite end, the redundancy versions corresponding to a plurality of consecutive subframes being identical to each other.

According to the information transmission device in the embodiments of the present disclosure, in the case of performing the rate matching on the bit stream of the information acquired after the encoding operation based on the redundancy version corresponding to each subframe, the redundancy versions corresponding to the plurality of consecutive subframes are identical to each other, so the same information is transmitted in the plurality of consecutive subframes after the rate matching, and thereby it is able for the opposite end to perform coherent combination on the information transmitted in the plurality of consecutive subframes. As compared with the related art where the opposite end cannot perform the coherent combination because the redundancy versions corresponding to the subframes recurrently vary along with the subframes and different information is transmitted in the subframes after the rate matching, in the embodiments of the present disclosure, the redundancy versions corresponding to the plurality of consecutive subframes are identical to each other, and thereby the same information is transmitted in the plurality of consecutive subframes after the rate matching. In this way, it is able for the opposite end to perform the coherent combination on the information transmitted in the plurality of consecutive subframes, thereby to prevent the decrease in the system spectral efficiency due to the information retransmission. In addition, the redundancy versions corresponding to the plurality of consecutive subframes are identical to each other in the repetition time period, and different redundancy versions may probably be provided within the entire repetition time period, i.e., the redundancy versions may vary within the entire repetition time period. As a result, it is able to perform incremental redundancy combination.

In some embodiments of the present disclosure, in the case of, with respect to each subframe contained in the repetition time period, determining the redundancy version corresponding to the subframe, the second processing unit 904 is further configured to, with respect to each subframe contained in the repetition time period, determine a redundancy version corresponding to a current subframe based on at least one predetermined redundancy version and a usage rule of the at least one predetermined redundancy version.

In some embodiments of the present disclosure, in the case of, with respect to each subframe contained in the repetition time period, determining, by the local end, the redundancy version corresponding to the current subframe based on the at least one predetermined redundancy version and the usage rule of the at least one predetermined redundancy version, the second processing unit 904 is further configured to: with respect to a first subframe contained in the repetition time period, determine an initial redundancy version as a redundancy version corresponding to the first subframe, the initial redundancy version being one of the at least one predetermined redundancy version; and with respect to each subframe contained in the repetition time period apart from the first subframe, determine the redundancy version corresponding to the current subframe based on the at least one predetermined redundancy version, a usage order of the at least one predetermined redundancy version, number of times repeating each redundancy version, and number of times the redundancy version corresponding to a previous subframe relative to the current subframe is repeated.

In some embodiments of the present disclosure, the second processing unit 904 is further configured to: with respect to each subframe contained in the repetition time period apart from the first subframe, in the case that the times of the redundancy version corresponding to the previous subframe which is to be consecutively and repeatedly used is smaller than the times of the redundancy version which is to be consecutively and repeatedly used, determine the redundancy version as the redundancy version corresponding to the current subframe; and in the case that the times of the redundancy version corresponding to the previous subframe which is to be consecutively and repeatedly used is equal to the times of the redundancy version which is to be consecutively and repeatedly used, determine the a redundancy version immediately subsequent to the redundancy version corresponding to the previous subframe as the redundancy version corresponding to the current subframe based on the usage order of the at least one predetermined redundancy version.

In some embodiments of the present disclosure, pattern information about the redundancy versions is pre-stored in the second processing unit 904, or in the case that the information transmission device is a network side device, the second processing unit 904 is further configured to determine the pattern information about the redundancy versions, and then notified to a UE. The pattern information about the redundancy versions includes at least one redundancy version and the usage order of the at least one redundancy version.

In some embodiments of the present disclosure, the second processing unit 904 is further configured to determine the initial redundancy version, or determine the initial redundancy version and notify it to the opposite end.

In some embodiments of the present disclosure, the second processing unit 904 is further configured to store therein the number of times repeating each redundancy version, or in the case that the information transmission device is the network side device, the second processing unit 904 is further configured to determine the number of times repeating each redundancy version and then notified to the UE.

In some embodiments of the present disclosure, the second processing unit 904 is further configured to determine whether or not to use the number of times repeating each redundancy version based on a predetermined rule, or in the case that the information transmission device is the network side device, indicate whether or not to use the number of times repeating each redundancy version through DCI.

In some embodiments of the present disclosure, in the case that the information transmission device is the network side device, the second processing unit 904 is further configured to: in the case that the local end indicates to use the number of times repeating each redundancy version through the DCI, determine the times of each redundancy version, which is to be consecutively and repeatedly used, pre-stored in the second processing unit as the number of times repeating each redundancy version, or determine the times of each redundancy version, which is to be consecutively and repeatedly used, pre-configured and notified by the network side end to the UE end of the local end and the opposite end as the number of times repeating each redundancy version; and in the case that the local end indicates not to use the number of times repeating each redundancy version through the DCI, determine the number of subframes contained in the repetition time period as the number of times repeating each redundancy version.

In some embodiments of the present disclosure, in the case of determining the number of times repeating each redundancy version based on the predetermined rule, the second processing unit 904 is further configured to determine the number of times repeating each redundancy version based on a code rate for information transmission.

In some embodiments of the present disclosure, the second processing unit 904 is further configured to: in the case that the code rate for information transmission is greater than or equal to a predetermined threshold, determine the times of each redundancy version, which is to be consecutively and repeatedly used, pre-stored in the second processing unit 904 as the number of times repeating each redundancy version, or determine the times of each redundancy version, which is to be consecutively and repeatedly used, pre-configured and notified by the network side end to the UE end as the number of times repeating each redundancy version; and in the case that the code rate for information transmission is smaller than the predetermined threshold, determine the number of subframes contained in the repetition time period as the number of times repeating each redundancy version.

In some embodiments of the present disclosure, the second processing unit 904 is further configured to pre-store therein the redundancy version corresponding to each subframe, or the transmission unit is further configured to transmit the redundancy version corresponding to each subframe contained in the repetition time period to the opposite end, so as to, upon the receipt of a message from the local end within the repetition time period, instruct the opposite end to perform a rate de-matching operation on the information using the redundancy version corresponding to each subframe within the repetition time period.

In some embodiments of the present disclosure, the information transmission device further includes a reception unit 908 connected to the second processing unit 904 and configured to: in the case that the local end serves as a receiving end, receive information from the opposite end within the repetition time period, and perform the rate matching on the bit stream of the information acquired after the encoding operation based on the redundancy version corresponding to each subframe contained in the repetition time period, redundancy versions corresponding to the plurality of consecutive subframes being identical to each other. The second processing unit is further configured to, with respect to the information transmitted in each subframe contained in the repetition time period, determine the redundancy version corresponding to the subframe, and perform the rate de-matching operation on the information transmitted in the subframe based on the redundancy version corresponding to the subframe.

The information transmission device in the embodiments of the present disclosure may serve as a part of, and be integrated into, the network side device and the UE. The first processing unit 902 and the second processing unit 904 may each be a Central Processing Unit (CPU). To be specific, the first processing unit 902 and the second processing unit 904 may be two CPUs, or a single CPU. The transmission unit 906 may be a transmitter or a signal transmitter, and the reception unit 908 may be a receiver or a signal receiver.

Figure 10:
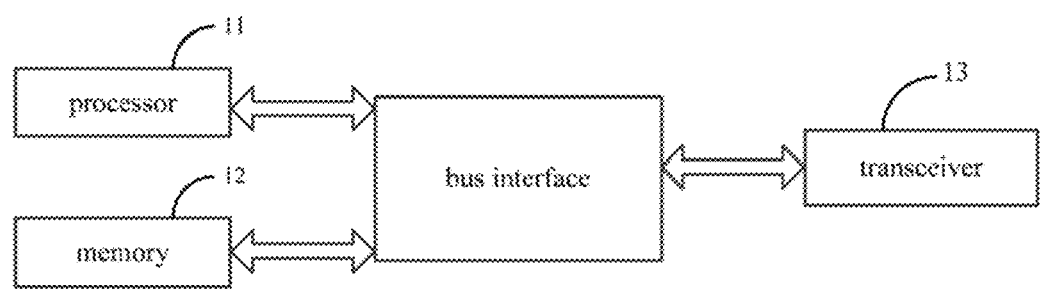
FIG. 10 is a schematic view showing the information transmission device at a network side in some embodiments of the present disclosure.

In the case that the local end or the opposite end where the information transmission device is located is the network side device, as shown in FIG. 10, the information transmission device may include a processor 11, a memory 12 and a transceiver 13. The processor 11 is configured to read a program stored in the memory 12, so as to: in the case that the information transmission device serves as a transmitting end, determine information to be repeatedly transmitted within a repetition time period containing a plurality of subframes; with respect to each subframe contained in the repetition time period, determine a redundancy version corresponding to the subframe, perform a rate matching on a bit stream acquired by encoding the information based on the redundancy version corresponding to the subframe, and transmit through the transceiver 13 the bit stream acquired after the rate matching to an opposite end, the redundancy versions corresponding to a plurality of consecutive subframes being identical to each other; receive through the transceiver 13, information transmitted from the UE within the repetition time period; and with respect to the information transmitted within each subframe contained in the repetition time period, determine the redundancy version corresponding to the subframe, and perform a rate de-matching operation on the information transmitted within the subframe based on the redundancy version corresponding to the subframe. The transceiver 13 is configured to receive and transmit data under the control of the processor 11.

In FIG. 10, bus architecture may include a number of buses and bridges connected to each other, so as to connect various circuits for one or more processors 11 and one or more memories 12. In addition, as is known in the art, the bus architecture may be used to connect any other circuits, such as a circuit for a peripheral device, a circuit for a voltage stabilizer and a power management circuit. Bus interfaces are provided, and the transceiver 13 may consist of a plurality of elements, i.e., a transmitter and a receiver for communication with any other devices over a transmission medium. The processor 11 may take charge of managing the bus architecture as well as general processings. The memory 12 may store therein data for the operation of the processor 11.

Figure 11:
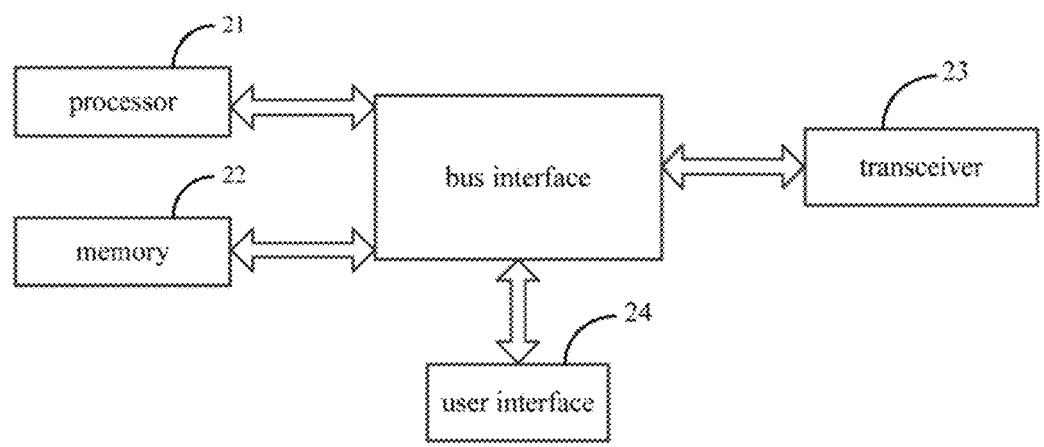
FIG. 11 is a schematic view showing the information transmission device at a UE side in some embodiments of the present disclosure.

In the case that the local end or the opposite end where the information transmission device is located is the UE, as shown in FIG. 11, the information transmission device may include a processor 21, a memory 22, a transceiver 23 and a user interface 24. To be specific, the processor 21 is configured to read a program stored in the memory 22, so as to: determine information to be repeatedly transmitted within a repetition time period containing a plurality of subframes; with respect to each subframe contained in the repetition time period, determine a redundancy version corresponding to the subframe, and perform a rate matching on a bit stream acquired by encoding the information based on the redundancy version corresponding to the subframe; transmit through the transceiver 23 the bit stream acquired after the rate matching to an opposite end, the redundancy versions corresponding to a plurality of consecutive subframes being identical to each other; receive through the transceiver 23 information transmitted from the UE within the repetition time period; and with respect to the information transmitted within each subframe contained in the repetition time period, determine the redundancy version corresponding to the subframe, and perform a rate de-matching operation on the information transmitted within the subframe based on the redundancy version corresponding to the subframe. The transceiver 23 is configured to receive and transmit data under the control of the processor 21.

In FIG. 11, bus architecture may include a number of buses and bridges connected to each other, so as to connect various circuits for one or more processors 21 and one or more memories 22. In addition, as is known in the art, the bus architecture may be used to connect any other circuits, such as a circuit for a peripheral device, a circuit for a voltage stabilizer and a power management circuit. Bus interfaces are provided, and the transceiver 23 may consist of a plurality of elements. i.e., a transmitter and a receiver for communication with any other devices over a transmission medium. With respect to different UEs, the user interface 24 may also be provided for devices which are to be arranged inside or outside the UE, and these devices may include but not limited to a keypad, a display, a speaker, a microphone and a joystick. The processor 21 may take charge of managing the bus architecture as well general processings. The memory 22 may store data therein desired for the operation of the processor 21.

According to the information transmission method and device in the embodiments of the present disclosure, in the case of performing the rate matching on the bit stream of the information acquired after the encoding operation based on the redundancy version corresponding to each subframe, the redundancy versions corresponding to the plurality of consecutive subframes are identical to each other, so the same information is transmitted in the plurality of consecutive subframes after the rate matching, and thereby it is able for the opposite end to perform coherent combination on the information transmitted in the plurality of consecutive subframes. As compared with the related art where the opposite end cannot perform the coherent combination because the redundancy versions corresponding to the subframes recurrently vary along with the subframes and different information is transmitted in the subframes after the rate matching, in the embodiments of the present disclosure, the redundancy versions corresponding to the plurality of consecutive subframes are identical to each other, and thereby the same information is transmitted in the plurality of consecutive subframes after the rate matching. In this way, it is able for the opposite end to perform the coherent combination on the information transmitted in the plurality of consecutive subframes, thereby to prevent the decrease in the system spectral efficiency due to the information retransmission. In addition, the redundancy versions corresponding to the plurality of consecutive subframes are identical to each other in the repetition time period, and different redundancy versions may probably be provided within the entire repetition time period, i.e., the redundancy versions may vary within the entire repetition time period. As a result, it is able to perform incremental redundancy combination.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An information transmission method, comprising:
   determining, by a local end serving as a transmitting end, information to be repeatedly transmitted within a repetition time period containing a plurality of subframes; and
   determining, by the local end, a redundancy version corresponding to each subframe in the repetition time period, performing a rate matching on a bit stream acquired by encoding the information based on the redundancy version corresponding to the each subframe, and transmitting the bit stream processed through the rate matching to an opposite end, wherein a plurality of consecutive subframes among the plurality of subframes in the repetition time period corresponds to an identical redundancy version;
   the determining, by the local end, the redundancy version corresponding to each subframe further comprises:
   determining, by the local end, the redundancy version corresponding to a current subframe based on at least one predetermined redundancy version and a usage rule of the at least one predetermined redundancy version;
   wherein the determining, by the local end, the redundancy version corresponding to the current subframe based on the at least one predetermined redundancy version and the usage rule of the at least one predetermined redundancy version further comprises:
   determining, by the local end, an initial redundancy version as the redundancy version corresponding to a first subframe in the repetition time period, wherein the initial redundancy version is one of the at least one predetermined redundancy version: and
   determining, by the local end, the redundancy version corresponding to the current subframe among the subframes subsequent to the first subframe based on the at least one predetermined redundancy version, a usage order of the at least one predetermined redundancy version, a number of times repeating each redundancy version, and a number of times the redundancy version corresponding to a previous subframe relative to the current subframe is repeated; wherein
   the determining, by the local end, the redundancy version corresponding to the current subframe among the subframes subsequent to the first subframe based on the at least one predetermined redundancy version, the usage order of the at least one predetermined redundancy version, the number of times repeating each redundancy version, and the number of times of the redundancy version corresponding to the previous subframe relative to the current subframe is repeated further comprises:

in the case that the number of times the redundancy version corresponding to the previous subframe relative to the current subframe is repeated is smaller than the number of times repeating the redundancy version corresponding to the previous subframe relative to the current subframe, determining the redundancy version corresponding to the previous subframe relative to the current subframe as the redundancy version corresponding to the current subframe; and in the case that the number of times the redundancy version corresponding to the previous subframe relative to the current subframe is repeated is equal to the number of times repeating the redundancy version corresponding to the previous subframe relative to the current subframe, determining the redundancy version following the redundancy version corresponding to the previous subframe relative to the current subframe in the usage order of the at least one predetermined redundancy version as the redundancy version corresponding to the current subframe; and redundancy version pattern information is pre-stored in the local end and the opposite end, or the redundancy version pattern information is pre-determined by a network side end of the local end and the opposite end and then notified to a User Equipment (UE) end of the local end and the opposite end, wherein the redundancy version pattern information relates to the at least one redundancy version and the usage order of the at least one redundancy version, and the initial redundancy version is determined by the local end and the opposite end, or the initial redundancy version is determined by the local end and then notified to the opposite end.

2. The information transmission method according to claim 1, wherein the number of times repeating each redundancy version is pre-stored in the local end and the opposite end, or the number of times repeating each redundancy version is determined by the network side end of the local end and the opposite end and then notified to the UE end of the local end and the opposite end.

3. The information transmission method according to claim 2, further comprising: notifying, by the network side end of the local end and the opposite end, whether or not to use the number of times repeating each redundancy version through Downlink Control Information (DCI), or determining, by the local end and the opposite end, whether or not to use the number of times repeating each redundancy version based on a predetermined rule;

wherein the indicating, by the network side end of the local end and the opposite end, whether or not to use the number of times repeating each redundancy version through the DCI further comprises:

in the case that the local end notifies through the DCI that the number of times repeating each redundancy version is used, determining the number of times repeating each redundancy version pre-stored in the local end and the opposite end as the number of times each redundancy version is to be repeated, or determining the number of times repeating each redundancy version pre-configured and notified by the network side end to the UE end of the local end and the opposite end as the number of times each redundancy version is to be repeated; and in the case that the local end notifies through the DCI that the predetermined number of times repeating each redundancy version is not used, determining a number of the subframes in the repetition time period as the number of times each redundancy version is to be repeated;

wherein the determining, by the local end and the opposite end, the number of times repeating each redundancy version based on the predetermined rule further comprises:

determining, by the local end and the opposite end, the number of times repeating each redundancy version based on a code rate for information transmission;

wherein the determining, by the local end and the opposite end, the number of times repeating each redundancy version based on the code rate for information transmission further comprises:

in the case that the code rate for information transmission is greater than or equal to a predetermined threshold, determining the number of times repeating each redundancy version pre-stored in the local end and the opposite end as the number of times each redundancy version is to be repeated, or determining the number of times repeating each redundancy version pre-configured and notified by the network side end to the UE end as the number of times each redundancy version is to be repeated; and in the case that the code rate for information transmission is smaller than the predetermined threshold, determining a number of the subframes in the repetition time period as the number of times each redundancy version is to be repeated.

4. The information transmission method according to claim 1, further comprising pre-storing the redundancy version corresponding to each subframe in the local end and the opposite end, or transmitting, by the local end, the redundancy version corresponding to each subframe in the repetition time period to the opposite end, to instruct the opposite end upon receiving a message transmitted from the local end within the repetition time period to perform a rate de-matching on the information based on the redundancy version corresponding to each subframe within the repetition time period.

5. An information transmission device, comprising:
a processor;
a memory connected to the processor via a bus interface and configured to store therein programs and data for the operation of the processor; and
a transceiver configured to communicate with any other device over a transmission medium,
wherein the processor is configured to call and execute the programs and data stored in the memory, to:
determine information to be repeatedly transmitted within a repetition time period containing a plurality of subframes;
determine a redundancy version corresponding to each subframe in the repetition time period, and perform a rate matching on a bit stream acquired by encoding the information based on the redundancy version corresponding to the each subframe; and
transmit the bit stream processed through the rate matching to an opposite end, wherein a plurality of consecutive subframes among the plurality of subframes in the repetition time period corresponds to an identical redundancy version;

wherein the processor is further configured to call and execute the programs and data stored in the memory, to determine the redundancy version corresponding to a current subframe based on at least one predetermined redundancy version and a usage rule of the at least one predetermined redundancy version;

wherein the processor is further configured to call and execute the programs and data stored in the memory, to:

determine an initial redundancy version as the redundancy version corresponding to a first subframe, wherein the initial redundancy version is one of the at least one predetermined redundancy version; and determine the redundancy version corresponding to the current subframe among the subframes subsequent to the first subframe based on the at least one predetermined redundancy version, a usage order of the at least one predetermined redundancy version, a number of times repeating each redundancy version, and a number of times the redundancy version corresponding to a previous subframe relative to the current subframe is repeated;

wherein the processor is further configured to call and execute the programs and data stored in the memory, to:

with respect to each subframe in the repetition time period subsequent to the first subframe, in the case that the number of times the redundancy version corresponding to the previous subframe relative to the current subframe is repeated is smaller than the number of times repeating the redundancy version corresponding to the previous subframe relative to the current subframe, determine the redundancy version corresponding to the previous subframe relative to the current subframe as the redundancy version corresponding to the current subframe; and in the case that the number of times the redundancy version corresponding to the previous subframe relative to the current subframe is repeated is equal to the number of times repeating the redundancy version corresponding to the previous subframe relative to the current subframe, determine the redundancy version following the redundancy version corresponding to the previous subframe relative to the current subframe in the usage order of the at least one predetermined redundancy version as the redundancy version corresponding to the current subframe;

and the processor is further configured to call and execute the programs and data stored in the memory, to pre-store redundancy version pattern information, or in the case that the information transmission device is a network device, determine the redundancy version pattern information and then notify the redundancy version pattern information to a User Equipment (UE) end at the opposite end, wherein the redundancy version pattern information relates to the at least one redundancy version and the usage order of the at least one redundancy version;

and the processor is further configured to call and execute the programs and data stored in the memory, to determine the initial redundancy version, or determine the initial redundancy version and notify the initial redundancy version to the opposite end.

6. The information transmission device according to claim 4, wherein the processor is further configured to call and execute the programs and data stored in the memory, to store the number of times repeating each redundancy version, or in the case that the information transmission device is the network side device, determine the number of times repeating each redundancy version and then notify the number of times repeating each redundancy version to the UE.

7. The information transmission device according to claim 6, wherein the processor is further configured to call and execute the programs and data stored in the memory, to notify whether or not to use the number of times repeating each redundancy version based on a predetermined rule, or in the case that the information transmission device is the network side device, notify through Downlink Control Information (DCI) whether or not to use the number of times repeating each redundancy version;

wherein in the case that the information transmission device is the network side device, the processor is further configured to call and execute the programs and data stored in the memory, to:

in the case of notifying through the DCI that the number of times repeating each redundancy version is used, determine the number of times repeating each redundancy version pre-stored in the local end and the opposite end as the number of times each redundancy version is to be repeated, or determine the number of times repeating each redundancy version pre-configured and notified by the network side end to the UE end as the number of times each redundancy version is to be repeated; and in the case of notifying through the DCI that the predetermined number of times repeating each redundancy version is not used, determine a number of the subframes in the repetition time period as the number of times each redundancy version is to be repeated;

wherein the processor is further configured to call and execute the programs and data stored in the memory, to determine the number of times repeating each redundancy version based on a code rate for information transmission;

wherein the processor is further configured to call and execute the programs and data stored in the memory, to:

in the case that the code rate for information transmission is greater than or equal to a predetermined threshold, determine the number of times repeating each redundancy version pre-stored in the second processing unit as the number of times each redundancy version is to be repeated, or in the case that the information transmission device is the network side device, determine the number of times repeating each redundancy version pre-configured and notified by the network side end to the UE end as the number of times each redundancy version is to be repeated; and in the case that the code rate for information transmission is smaller than the predetermined threshold, determine a number of the subframes in the repetition time period as the number of times each redundancy version is to be repeated.

8. The information transmission device according to claim 5, wherein the processor is further configured to call and execute the programs and data stored in the memory, to pre-store the redundancy version corresponding to each subframe, or transmit the redundancy version corresponding to each subframe in the repetition time period to the opposite end, to instruct the opposite end upon receiving a message transmitted from the local end within the repetition time period to perform a rate de-matching on the information based on the redundancy version corresponding to each subframe within the repetition time period.

* * * * *